United States Patent
Cherian et al.

(10) Patent No.: US 11,034,621 B2
(45) Date of Patent: Jun. 15, 2021

(54) STRUVITE-K/SYNGENITE BUILDING COMPOSITIONS COMPRISING SILICATE MATERIALS AND BUILDING ARTICLES SUCH AS WALLBOARDS MADE THEREFROM

(71) Applicant: CertainTeed Gypsum, Inc., Malvern, PA (US)

(72) Inventors: Isaac Cherian, Shrewsbury, MA (US); Gaurav Pattarkine, Shrewsbury, MA (US); Michael Lemberger, Dudley, MA (US); John Walter College, Pittsburgh, PA (US)

(73) Assignee: CeriainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 16/148,518

(22) Filed: Oct. 1, 2018

(65) Prior Publication Data
US 2019/0100463 A1   Apr. 4, 2019

Related U.S. Application Data

(60) Provisional application No. 62/566,382, filed on Sep. 30, 2017.

(51) Int. Cl.
| | |
|---|---|
| C04B 28/34 | (2006.01) |
| C04B 14/04 | (2006.01) |
| C04B 14/08 | (2006.01) |
| C04B 14/42 | (2006.01) |
| C04B 14/00 | (2006.01) |
| C04B 20/00 | (2006.01) |
| C04B 18/08 | (2006.01) |
| C04B 111/00 | (2006.01) |

(52) U.S. Cl.
CPC .......... C04B 28/344 (2013.01); C04B 14/005 (2013.01); C04B 14/04 (2013.01); C04B 14/043 (2013.01); C04B 14/08 (2013.01); C04B 14/42 (2013.01); C04B 18/08 (2013.01); C04B 20/004 (2013.01); C04B 28/34 (2013.01); C04B 2111/0062 (2013.01); C04B 2111/00612 (2013.01)

(58) Field of Classification Search
CPC ....... C04B 14/04; C04B 14/08; C04B 14/043; C04B 14/42; C04B 14/005; C04B 18/08; C04B 20/004; C04B 28/34; C04B 28/344; C04B 2111/0062; C04B 2111/00612
See application file for complete search history.

(56) References Cited

U.S. PATENT DOCUMENTS

| | | |
|---|---|---|
| 2,033,159 A | 3/1936 | Storch et al. |
| 2,562,859 A | 7/1950 | Camp |
| 2,526,537 A | 10/1950 | Camp |
| 3,179,529 A | 4/1965 | Hickey et al. |
| 3,454,456 A | 7/1969 | Wiley |
| 4,504,555 A | 3/1985 | Prior et al. |
| 4,604,318 A | 8/1986 | Prior et al. |
| 5,035,872 A | 7/1991 | Loblich et al. |
| 5,194,087 A | 3/1993 | Berg |
| 5,256,222 A | 10/1993 | Shepherd et al. |
| 5,830,815 A | 11/1998 | Wagh et al. |
| 5,846,894 A | 12/1998 | Singh et al. |
| 6,136,088 A | 10/2000 | Farrington |
| 6,251,979 B1 | 6/2001 | Luongo |
| 6,319,312 B1 | 11/2001 | Luongo |
| 6,340,388 B1 | 1/2002 | Luongo |
| 6,391,958 B1 | 5/2002 | Luongo |
| 6,403,688 B1 | 6/2002 | Luongo |
| 6,998,012 B2 | 2/2006 | Koelicker et al. |
| 7,045,476 B1 | 5/2006 | Lally |
| 7,407,545 B2 | 8/2008 | Wallner |
| 7,429,290 B2 | 9/2008 | Lally |
| 7,491,267 B2 | 2/2009 | Francis |
| 7,740,700 B2 | 6/2010 | Wallner |
| 7,744,693 B2 | 6/2010 | Mabey |
| 7,867,597 B2 | 1/2011 | Feigin et al. |
| 7,914,914 B2 | 3/2011 | Tinianov |
| 7,955,587 B2 | 6/2011 | College |
| 8,337,993 B2 | 12/2012 | Surace et al. |
| 8,397,864 B2 | 3/2013 | Tinianov |
| 8,623,304 B2 | 1/2014 | Saito et al. |

(Continued)

FOREIGN PATENT DOCUMENTS

| | | |
|---|---|---|
| CN | 105130377 A | 12/2015 |
| CN | 106186791 A | 12/2016 |

(Continued)

OTHER PUBLICATIONS

Simkiss, K. and Taylor, M.G. "Calcium Magnesium Phosphate Granules: Atomic Simulations Explaining Death", Journal of Experimental Biology vol. 190; pp. 131-139 (1990).

Du, Cai-yi; Yan, Yun; Hu, Zhi-hua; Xie, Xiao-li; Wang, Su Juan, "Study on New Type Phosphogypsum Lightweight Porous Material", Journal of Building Materials, vol. 11(3), pp. 353-358 (2008), provided with translation.

Amaral, L.F. et al. "Chelants to inhibit magnesia (MgO) hydration", Ceramics, International, vol. 37, pp. 1537-1542 (2011).

(Continued)

*Primary Examiner* — Anthony J Green (74) *Attorney, Agent, or Firm* — McDonnell Boehnen Hulbert & Berghoff LLP (57) ABSTRACT

The present disclosure relates generally to building materials, such as building boards, having improved strength and reduced shrinkage. More particularly, the present disclosure provides building compositions comprising Struvite-K ($KMgPO_4 \cdot 6H_2O$), Syngenite ($K_2Ca(SO_4)_2 \cdot H_2O$), and one or more silicate additives suitable for use in building materials.

19 Claims, 2 Drawing Sheets

(56) References Cited

U.S. PATENT DOCUMENTS

| | | |
|---|---|---|
| 2002/0017222 A1 | 2/2002 | Luongo |
| 2003/0010258 A1 | 1/2003 | Fukuda et al. |
| 2003/0084980 A1 | 5/2003 | Sufert et al. |
| 2005/0229809 A1 | 10/2005 | Lally |
| 2008/0171179 A1 | 7/2008 | Surace |
| 2009/0000866 A1 | 1/2009 | Tinianov |
| 2010/0101457 A1 | 4/2010 | Surace et al. |
| 2011/0061324 A1 | 3/2011 | Tinianov |
| 2012/1000295 | 4/2012 | Dubey |
| 2015/0059621 A1* | 3/2015 | Hauber ................. C04B 12/025 106/690 |
| 2016/0236979 A1* | 8/2016 | Hauber ................. C04B 24/42 |
| 2017/0008804 A1* | 1/2017 | Hauber ................. C04B 12/025 |
| 2017/0190147 A1 | 7/2017 | Brooks |

FOREIGN PATENT DOCUMENTS

| | | |
|---|---|---|
| DE | 3326796 C1 | 11/1984 |
| DE | 3914796 C1 | 5/1990 |
| IL | 59066 A | 7/1983 |
| JP | H04-164853 A | 6/1992 |
| WO | 2006/115496 A1 | 11/2006 |
| WO | 2011/038277 A1 | 3/2011 |
| WO | 2012/116313 A1 | 8/2012 |
| WO | 2012/122102 A2 | 9/2012 |

OTHER PUBLICATIONS

Dinga, Zhu et al. "Cementing mechanism of potassium phosphate based magnesium phosphate cement," Ceramics, International, vol. 38, pp. 6281-6288 (2012).

Hammi, H. et al. "Optimisation of the preparation of a phosphomagnesium cement based on struvite and K-struvite," MATEC Web of Confrences, vol. 3, p. 01071 (2013).

Zhang, S. et al. "Dehydration characteristics of struvite-K pertaining to magnesium potassium phosphate cement system in non-isothermal condition," Journal of Thermal Analysis and Calorimetry vol. 111, pp. 35-40 (2013).

University of Toronto Conference "Syngenite Formation"—T. Ramlochan, R.D. Hooton, date unknown.

International Search Report and Written Opinion, International Patent Application PCT/US2018/537401, dated Apr. 18, 2019.

* cited by examiner

FIG. 4

STRUVITE-K/SYNGENITE BUILDING COMPOSITIONS COMPRISING SILICATE MATERIALS AND BUILDING ARTICLES SUCH AS WALLBOARDS MADE THEREFROM

CROSS-REFERENCE TO RELATED APPLICATIONS

This application claims the benefit of priority of U.S. Provisional Patent Application No. 62/566,382, filed Sep. 30, 2018, which is hereby incorporated herein by reference in its entirety.

BACKGROUND OF THE DISCLOSURE

1. Field of the Disclosure

The present disclosure relates generally to building materials, such as wallboards, having improved strength and reduced shrinkage. More particularly, the present disclosure provides building compositions comprising Struvite-K ($KMgPO_4 \cdot 6H_2O$), Syngenite ($K_2Ca(SO_4)_2 \cdot H_2O$), and one or more silicate additives suitable for use in building materials.

2. Technical Background

One-half inch (1.27 cm) wallboard typically has a density range of from about 1,600 pounds (lbs) to about 1,800 lbs per thousand square feet (lbs/MSF) (about 7.8 kilograms (kg) to about 8.3 kg per square meter ($m^2$)). Heavy or high-density gypsum wallboards are costly and more difficult to manufacture, transport, store, and manually install at job sites. The recent trend has been toward lighter or low-density boards. While wallboards having reduced densities through adding lightweight additives and foams are known, one-half inch (1.27 cm) wallboard having a density of less than about 1,600 lbs/MSF (about 7.8 kg/$m^2$) is usually of low strength and may be unacceptable for commercial or residential use. Because extra high-density or heavy gypsum wallboards are generally not desirable for the reasons set forth above, wallboards having reduced weight without sacrificing board integrity and strength are needed.

Low cost Struvite-K and Syngenite compositions (also "Mag-Board" or "MgO-MKP board") were described in U.S. Pat. No. 9,422,193, incorporated by reference herein. It was determined that, in order to reduce manufacturing costs, it was desirable to increase the stucco ($CaSO_4 \cdot \frac{1}{2} H_2O$; also known as calcium sulfate hemihydrate, calcined gypsum, or plaster of Paris) content in the composition from 25% to 50%. But the increase in the stucco content in the Struvite-K and Syngenite compositions led to severe compromise in the high temperature thermal shrinkage characteristics. Typically thermal shrinkage tests are carried out at 983° C. for 10 minutes or longer. However, Struvite-K and Syngenite compositions having high stucco content showed substantial shrinkage from sintering at above 800° C.

Therefore, innovative solutions are needed to provide lightweight novel building compositions that can provide the desired the structural integrity, fire resistance, and reduced thermal shrinkage while simultaneously being cost and energy efficient.

SUMMARY OF THE DISCLOSURE

The present inventors have found simple and cost-efficient building compositions that have good structural integrity and improved high temperature thermal shrinkage. Specifically, the inventors have founds that use of novel additive materials affords building compositions that are lightweight and have lower densities while maintaining the required compression strength, water absorption, and fire resistance.

Thus, in one aspect, the present disclosure provides building compositions comprising:
  Struvite-K ($KMgPO_4 \cdot 6H_2O$);
  Syngenite ($K_2Ca(SO_4)_2 \cdot H_2O$); and
  one or more silicate additives.

Another aspect of the disclosure provides building articles comprising the building compositions of the disclosure.

In another aspect, the present disclosure provides a method for making the building compositions of the disclosure, the method comprising:
  mixing together magnesium oxide (MgO), monopotassium phosphate ($KH_2PO_4$), stucco ($CaSO_4 \cdot \frac{1}{2} H_2O$), one or more silicate additives, and water with mixing (e.g., in a mixer reaction chamber) to form a reaction mixture; and
  allowing the reaction mixture to set to provide the building composition.

In some embodiments, MgO is present in amount of about 3.33 to about 70 weight % based on the total combined weight of MgO, $KH_2PO_4$, and stucco; $KH_2PO_4$ is present in amount of about 4.67 to about 70 weight % based on the total combined weight of MgO, $KH_2PO_4$, and stucco; stucco is present in amount of about 10.5 to about 90 weight % based on the total combined weight of MgO, $KH_2PO_4$, and stucco. In some embodiments, one or more silicate additives is present in amount of about 0.1 to about 5 weight %, based on the total combined weight of MgO, $KH_2PO_4$, and stucco. In some embodiments, water is present in amount of about 20 to about 40 weight % based on the total combined weight of MgO, $KH_2PO_4$, and stucco.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Before the disclosed processes and materials are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting. In view of the present disclosure, the materials and processes described herein can be configured by the person of ordinary skill in the art to meet the desired need.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified.

Struvite-K (also K-Struvite or Struvite (K)), which is $KMg(PO_4) \cdot 6(H_2O)$, was previously found to be suitable in the building industry as a result of a variety of characteristics, including its orthorhombic crystal structure, glassy sheen permitting substantially friction free motion, and resistance to heat transfer. Likewise, Syngenite, which is $K_2Ca(SO_4)_2 \cdot H_2O$, was found to be more fire resistant than gypsum, yet more plasto-elastomeric, i.e., less brittle and more flexible. As provided in U.S. Pat. No. 9,422,193 (incorporated by reference herein in its entirety for all purposes), building compositions comprising Syngenite and Struvite-K provide significant benefits, particularly compared to traditional magnesium oxide wallboards. But the content of Struvite-K and Syngenite in the final composition needs to be adjusted in order to obtain the building composition having the desired properties. For example, the content of Struvite-K and Syngenite can be adjusted by using varying amounts of starting materials (e.g., MgO, $KH_2PO_4$ (also as "MKP"), and stucco), using varying amounts of water, optimizing the mixing process, mixing speed, reaction time, etc. The Struvite-K and Syngenite may be generally obtained from magnesium oxide, MKP and stucco via the chemical process:

In general, the disclosed materials, methods, and apparatus provide improvements in building compositions that are cost-efficient and have good structural integrity and improved high temperature thermal shrinkage. Specifically, the inventors have found that use of novel silicate additive materials can afford lightweight building compositions that have higher compression strength than the known Struvite-K and Syngenite compositions while maintaining their desirable lower density, water absorption and fire resistance. The building compositions of the disclosure can also have improved set times compared to the known Struvite-K and Syngenite compositions. As used herein, "set time" means the time between a point at which magnesium phosphate and hydration reactions (setting) begin (e.g., when all primary components, such as MgO, $KH_2PO_4$, and stucco, are blended into water) and a point at which the magnesium phosphate and hydration reactions are completed. For example, in certain embodiments "set time" may be measured by commencing the hydration reaction, discharging a sample after a fixed time, and determining the resistance in penetration of the sample using a Vicat apparatus. The Vicat apparatus consists of a steel needle of a specific diameter (e.g., about 0.97 mm) screwed on to a steel shaft whose combined weight is about 279.21 g, which is attached to a scale with a needle that tracks its movement in mm. The sample is placed on a flat glass plate and the steel needle probes the sample for resistance to penetration in specific time intervals under free fall from gravity conditions (e.g., by placing the needle about a few mm above the surface of the sample and allowing it to free fall.) The set time ends when the penetration into the sample is less than about 1 mm.

Thus, in one aspect, the present disclosure provides building compositions comprising:
Struvite-K ($KMgPO_4 \cdot 6H_2O$);
Syngenite ($K_2Ca(SO_4)_2 \cdot H_2O$); and
one or more silicate additives.

In certain embodiments of the building compositions as otherwise described herein, the Struvite-K is present in the composition in an amount of about 0.1 wt % to about 67 wt %, or about 0.1 wt % to about 50 wt %, for example, about 0.1 wt % to about 40 wt %, or about 0.1 wt % to about 30 wt %, or about 0.1 wt % to about 20 wt %, or about 1 wt % to about 67 wt %, or about 1 wt % to about 50 wt %, or about 1 wt % to about 40 wt %, or about 1 wt % to about 30 wt %, or about 1 wt % to about 20 wt %, or about 10 wt % to about 67 wt %, or about 10 wt % to about 50 wt %, or about 10 wt % to about 40 wt %, or about 10 wt % to about 30 wt %, or about 10 wt % to about 20 wt %, or about 20 wt % to about 67 wt %, or about 20 wt % to about 50 wt %, or about 20 wt % to about 45 wt %, or about 20 wt % to about 40 wt %, or about 20 wt % to about 30 wt %, or about 25 wt % to about 50 wt %, or about 25 wt % to about 45 wt %, or about 30 wt % to about 45 wt %, or about 25 wt % to about 35 wt %. All wt % values described in this disclosure are on a dry weight basis of the total weight of the building composition (i.e., set building composition), including water of hydration but excluding any water evaporable under setting conditions.

For example, in certain embodiments as otherwise described herein, Struvite-K is present in an amount of about 10 wt % to about 50 wt %.

In certain embodiments as otherwise described herein, Struvite-K is present in an amount of about 20 wt % to about 67 wt %.

In certain embodiments of the building compositions as otherwise described herein, the Syngenite is present in the composition in an amount of about 1 wt % to about 80 wt %, or about 1 wt % to about 70 wt %, for example, about 1 wt % to about 60 wt %, or about 1 wt % to about 50 wt %, or about 5 wt % to about 80 wt %, or about 5 wt % to about 70 wt %, or about 5 wt % to about 60 wt %, or about 5 wt % to about 50 wt %, or about 5 wt % to about 40 wt %, or about 5 wt % to about 30 wt %, or about 5 wt % to about 20 wt %, or about 5 wt % to about 15 wt %, or about 5 wt % to about 10 wt %, or about 10 wt % to about 80 wt %, or about 10 wt % to about 70 wt %, or about 10 wt % to about 60 wt %, or about 10 wt % to about 50 wt %, or about 30 wt % to about 80 wt %, or about 30 wt % to about 70 wt %, or about 30 wt % to about 60 wt %, or about 30 wt % to about 50 wt %, or about 40 wt % to about 60 wt %, or about 7 wt % to about 15 wt %, or about 7 wt % to about 12 wt %, or about 8 wt % to about 11 wt %, all based on the total dry weight of the building composition.

For example, in certain embodiments as otherwise described herein, Syngenite is present in an amount in the range of about 10 wt % to about 50 wt %.

In certain embodiments as otherwise described herein, Syngenite is present in an amount in the range of about 30 wt % to about 70 wt %.

The building compositions can also include other components. For example, in certain embodiments, the building composition as otherwise described herein further comprises a calcium sulfate material (i.e., calcium sulfate in any state of hydration and crystallinity). When present, the calcium sulfate material may be in the building composition, for example, in an amount of about 0.1 wt % to about 67 wt %, for example, about 0.1 wt % to about 50 wt %, or about 0.1 wt % to about 40 wt %, or about 0.1 wt % to about 30 wt %, or about 0.1 wt % to about 20 wt %, or about 1 wt % to about 67 wt %, or about 1 wt % to about 50 wt %, or about 1 wt % to about 40 wt %, or about 1 wt % to about 30 wt %, or about 1 wt % to about 20 wt %, or about 10 wt % to about 67 wt %, or about 10 wt % to about 50 wt %, or about 10 wt % to about 40 wt %, or about 10 wt % to about 30 wt %, or about 10 wt % to about 20 wt %, or about 18 wt % to about 32 wt %, or about 25 wt % to about 35 wt %, or about 20 wt % to about 30 wt %, or about 27 wt % to about 32 wt %, or about 27 wt % to about 30 wt %, all based on the total dry weight of the building composition. In certain embodiments, the calcium sulfate material is present in an amount in the range of 0.1 wt % to about 30 wt %. In certain embodiments, the calcium sulfate material is present in an amount of about 0.1 wt % to about 10 wt %.

A variety of calcium sulfate materials may be present in the building compositions of the disclosure. For example, in certain embodiments as otherwise described herein, a building composition of the disclosure includes anhydrite ($CaSO_4$), stucco ($CaSO_4 \cdot \frac{1}{2} H_2O$), gypsum ($CaSO_4 \cdot 2H_2O$), or a combination of two or more thereof. For example, in certain embodiments, stucco is present in the composition. In certain embodiments, gypsum is present in the composition. When present, the total amount of anhydrite, stucco and gypsum in the building composition may be, for example, in the range of about 0.1 wt % to about 67 wt %, for example, about 0.1 wt % to about 50 wt %, or about 0.1 wt % to about 40 wt %, or about 0.1 wt % to about 30 wt %, or about 0.1 wt % to about 20 wt %, or about 1 wt % to about 67 wt %, or about 1 wt % to about 50 wt %, or about 1 wt % to about 40 wt %, or about 1 wt % to about 30 wt %, or about 1 wt % to about 20 wt %, or about 10 wt % to about 67 wt %, or about 10 wt % to about 50 wt %, or about 10 wt % to about 40 wt %, or about 10 wt % to about 30 wt %, or about 10 wt % to about 20 wt %, or about 18 wt % to about 32 wt %, or about 25 wt % to about 35 wt %, or about 20 wt % to about 30 wt %, or about 27 wt % to about 32 wt %, or about 27 wt % to about 30 wt %, all based on the total dry weight of the building composition. In certain embodiments, the calcium sulfate material is present in an amount in the range of 0.1 wt % to about 30 wt %. In certain embodiments, the calcium sulfate material is present in an amount of about 0.1 wt % to about 10 wt %.

In certain embodiments, bassanite (another calcium sulfate form) is present in the calcium sulfate material of the building composition. In certain embodiments, bassanite is present in an amount, e.g., up to about 20 wt %, up to about 10 wt % or up to about 5 wt %.

In certain embodiments, the building composition is substantially free of (e.g., having less than 3 wt % or even less than 1 wt %) gypsum.

In some embodiments, the building composition as otherwise described herein may further comprise magnesium oxide (MgO). MgO, for example, may present in the final composition as unreacted material used in the processes to prepare the building composition of the disclosure. In some embodiments, MgO may be in the building composition in an amount of about 0.1 wt % to about 20 wt %, or about 0.1 wt % to about 15 wt %, or about 0.1 wt % to about 10 wt %, or about 0.1 wt % to about 5 wt %, or about 1 wt % to about 20 wt %, or about 1 wt % to about 15 wt %, or about 1 wt % to about 10 wt %, or about 1 wt % to about 5 wt %, or about 5 wt % to about 20 wt %, or about 5 wt % to about 15 wt %, or about 5 wt % to about 10 wt %, or about 2 wt % to about 10 wt %, or about 2 wt % to about 8 wt %, or about 3 wt % to about 6 wt %, or about 4 wt % to about 5 wt %, all based on the total dry weight of the building composition. In certain embodiments, MgO is present in an amount in the range of about 2 wt % to about 10 wt %.

In certain embodiments, the building composition as otherwise described herein comprises Struvite-K present in the composition in an amount of about 10 wt % to about 50 wt %, Syngenite present in the composition in an amount of about 5 wt % to about 30 wt %, MgO present in the composition in an amount of about 2 wt % to about 10 wt %, and stucco present in the composition in an amount of about 1 wt % to about 35 wt %.

In some embodiments, the building composition as otherwise described herein comprises Struvite-K present in the composition in an amount of about 25 wt % to about 33 wt %, Syngenite present in the composition in an amount of about 7 wt % to about 12 wt %, MgO present in the composition in an amount of about 3 wt % to about 6 wt %, and stucco present in the composition in an amount of about 26 wt % to about 31 wt %.

Any of the Struvite-K and Sygenite-containing compositions described in U.S. Pat. No. 9,422,193, which is hereby incorporated herein by reference in its entirety, can be modified with silicates as described herein.

As described above, the building composition of the present disclosure includes one or more silicate additives, for example, substantially dispersed throughout the composition. As used herein, "silicate additive" is any compound containing an oxide of silicon, having at least 50 mol % oxide of silicon (e.g., at least 75 mol %, or in some embodiments at least 90 mol %) on a semimetal/metal atomic basis (i.e., excluding nitrogen, oxygen, halogens and hydrogen, but including phosphorus, boron and aluminum). Such oxides of silicon can include silicon, e.g., in the form of silicon dioxide, silicates, aluminosilicates, phosphosilicates, or other complex silicates. Silicates can be provided in a variety of forms, including glassy forms.

The silicate additives can be provided in a variety of particle sizes, from nanometer to micrometer to even millimeter size ranges. Moreover, certain of the silicate additives (e.g., glass fibers, glass platelets, wollastonite, basalt fibers), can be provided with an aspect ratio (i.e., longest dimension divided by shortest dimension) of at least 5:1, at least 10:1, or even at least 15:1.

In certain embodiments as otherwise described herein, the one or more silicate additives includes (or is) a silica material, i.e., including at least 90%, or even at least 95% $SiO_2$. Such materials are typically identified with descriptors such as "silicon dioxide," "fused quartz," "quartz," or "fused silica" or "silica." The silica material can be provided in a variety of sizes. For example, in one embodiment as otherwise described herein, the one or more silicate additives includes (or is) a nanoparticulate silica, for example, having an average particle size in the range of about 1-500 nm, e.g., about 5-200 nm. Such nanoparticulate silica can be amorphous, and is available under descriptors such as, for example, fumed silica or silica fume. One certain type of nanoparticulate silica is amorphous silica having a particle size of about 5-50 nm and a surface area of about 50-600 m²/g). Another type of nanoparticulate silica is amorphous silica having particle size of less than 1 μm, with an average in the range of about 100-200 nm (e.g., about 150 nm), and a surface area of about 15-30 m²/g). In other embodiments as otherwise described herein, the one or more silicate additives includes (or is) a microparticulate silica material, for example, having an average particle size in the range of about 1-500 μm, e.g., about 10-200 μm).

In certain embodiments as otherwise described herein, the one or more silicate additives includes (or is) diatomaceous earth. Diatomaceous earth is typically 80-90% silica, with 2-4% alumina and small amounts of iron oxide and other inorganic components. The diatomaceous earth can be provided with average particle sizes, e.g., in the range of about 10-200 μm.

In certain embodiments as otherwise described herein, the one or more silicate additives includes (or is) fly ash (i.e., a coal combustion byproduct comprising amorphous and crystalline silica, $Al_2O_3$, $Fe_2O_3$, and CaO). Fly ash, for example, may be Class C or Class F (i.e., depending on CaO content), with Class C having a higher CaO content (e.g., more than 15% or more than 20%) and Class F having a lower CaO content (e.g., less than 15% or less than 10%). In some embodiments, the silicate additive is fly ash Class F. In some embodiments, the silicate additive is fly ash Class C. The fly ash can be provided with average particle sizes, e.g., in the range of about 10-40 μm.

In certain embodiments as otherwise described herein, the one or more silicate additives includes (or is) slag or slag cement. Slag and slag cement are byproducts of metal smelting comprising a mixture of silica and metal oxides. The slag or slag cement can be provided with average particle sizes, e.g., in the range of 1 nm to about 500 nm.

In certain embodiments as otherwise described herein, the one or more silicate additives includes (or is) an alkali silicate, e.g., a sodium silicate or a potassium silicate, such as, for example, one or more of sodium silicate ($Na_2SiO_3$, such as water glass), sodium orthosilicate ($Na_4SiO_4$), sodium pyrosilicate ($Na_6Si_2O_7$), potassium silicate ($K_2SiO_3$), or a combination thereof. The alkali silicates can be provided, for example, in solid form or dissolved in water.

In certain embodiments as otherwise described herein, the one or more silicate additives includes (or is) an alkaline earth silicate, such as a calcium and/or magnesium silicate, for example, calcium silicate ($CaSiO_3$), dicalcium silicate (cal-sil or calcium orthosilicate), or calcium magnesium silicate. The alkaline earth silicates can be provided, for example, in solid form or dissolved in water.

In certain embodiments as otherwise described herein, the one or more silicate additives includes (or is) silicic acid. The silicic acid can be provided, for example, in solid form or dissolved in water.

In certain embodiments as otherwise described herein, the one or more silicate additives includes (or is) wollastonite. The wollastonite can be provided with average particle sizes, e.g., in the range of about 10-500 μm. The wollastonite can be provided, e.g., with an aspect ratio of at least 5:1, at least 10:1, or even at least 15:1.

In certain embodiments as otherwise described herein, the one or more silicate additives includes (or is) glass or ceramic, for example, in the form of fibers or platelets. Such fibers or platelets can be made from, for example, silicate, aluminosilicate, borosilicate, or phosphosilicate glasses (i.e., and combinations thereof), or a variety of ceramics (e.g., mullite). In certain embodiments, such fiber or platelet materials may have softening point around 1010° C. or more. The fibers or platelets can be, in certain embodiments, silane treated. In certain embodiments, the silane treatment is used to provide anti-static properties and promote adhesion. In certain desirable embodiments, the fibers or platelets, whether silane-treated or not, have an average length of less than 15 mm, e.g., less than 10 mm, or, less than 8 mm. In certain desirable embodiments, the fibers have a cross-sectional area (i.e., perpendicular to length) of no more than 2 mm², no more than 1 mm², or no more than 0.5 mm². In certain desirable embodiments, the fibers have a diameter in a range of about 5 μm to about 40 μm, or about 10 μm to about 30 μm, or about 15 μm to about 20 μm.

In certain embodiments as otherwise described herein, the one or more silicate additives includes (or is) basalt fibers. The basalt fibers can be provided with average length of less than 30 mm, e.g., less than 25 mm, or less than 15 mm, or less than 10 mm, or less than 8 mm.

In certain embodiments as otherwise described herein, the one or more silicate additives includes (or is) glass or ceramic bubbles (or centrospheres). While glass or ceramic bubbles are generally rounded in shape, they need not be perfectly spherical. Such bubbles can be made from, for example, silicate, aluminosilicate, borosilicate, or phosphosilicate glasses (i.e., and combinations thereof), or a variety of ceramics (e.g., mullite). The glass bubbles are hollow In certain desirable embodiments, the glass bubbles have a size of less than about 500 μm, or less than about 300 μm, or less than about 100 μm.

Of course, a wide variety of other silicate materials can be used as silicate additives in the methods and materials as otherwise described herein. In certain embodiments, the one or more silicate additives includes (or is) one or more of silicate minerals such as nesosilicates (or orthosilicates) having a $SiO_4^{4-}$ group, inosilicates having a $SiO_3^{2-}$ or $Si_4O_{11}^{6-}$ group (such as wollastonite), phyllosilicates having a $Si_2O_5^{2-}$ group (such as micas, talc, kaolin, and clays), tectosilicates having $SiO_2$ or $Al_xSi_yO_{2x+2y}^{x-}$ group (such as quartz and feldspars).

The person of ordinary skill in the art will appreciate based on the present description that the one or more silicate additives can be provided in a range of suitable amounts. In certain embodiments as otherwise described herein, the one or more silicate additives are present in an amount of about 0.1% to about 15% by weight of the total dry weight of the building composition. For example, in various embodiments as otherwise described herein, the one or more silicate additives are present in an amount of about 0.1 wt % to about 10 wt %, or about 0.1 wt % to about 7 wt %, or about 0.1 wt % to about 5 wt %, or about 0.1 wt % to about 2 wt %, or about 0.1 wt % to about 1 wt %, or about 0.5 wt % to about 15 wt %, or about 0.5 wt % to about 10 wt %, or about 0.5 wt % to about 7 wt %, or about 0.5 wt % to about 5 wt %, or about 0.5 wt % to about 3 wt %, or about 0.5 wt % to about 1 wt %, or about 1 wt % to about 15 wt %, or about 1 wt % to about 10 wt %, or about 1 wt % to about 7 wt %, or about 1 wt % to about 5 wt %, or about 1 wt % to about 2 wt %, or about 2 wt % to about 15 wt %, or about 2 wt % to about 10 wt %, or about 2 wt % to about 7 wt %, or about 2 wt % to about 5 wt %. In other embodiments as otherwise described herein, the one or more silicate additives are present in an amount of about 4 wt % to about 15 wt %, or about 4 wt % to about 10 wt %, or about 4 wt % to about 7 wt %, based on the total dry weight of the building composition.

The inventors have determined that suitable building compositions can be formed substantially from a combination of Struvite-K and Syngenite, with one or more silicate additives (including any reaction products thereof), and optionally magnesium oxide and/or calcium sulfate material. For example, in certain embodiments of the building compositions as otherwise described herein, the combined content of Struvite-K, Syngenite, the one or more silicate additives (including any reaction products thereof), magnesium (i.e., in a form other than Struvite-K, and magnesium oxide), calcium (i.e., in a form other than Syngenite and calcium sulfate), phosphate (i.e., in a form other than Struvite-K), and optionally magnesium oxide and/or calcium sulfate material is at least about 80 wt % based on the total dry weight of the building material. In various embodiments of the building composition as otherwise described herein, the combined content of Struvite-K, Syngenite, the one or more silicate additives (including any reaction products thereof), magnesium (i.e., in a form other than Struvite-K, and magnesium oxide), calcium (i.e., in a form other than Syngenite and calcium sulfate), phosphate (i.e., in a form other than Struvite-K), and optionally magnesium oxide and/or calcium sulfate material is at least about 85 wt %, or at least about 90 wt %, or at least about 95 wt %, or at least about 97 wt %, or at least about 98 wt %, or at least about 99 wt %, or about 100 wt % of the building composition.

The person of ordinary skill in the art will appreciate that the amounts and identities of the materials in a particular building composition can be identified in a variety of ways, including conventional chemical analysis, microscopy, and crystallography.

As noted above, other aspects of the disclosure provide methods for making building compositions such as those described herein. In one aspect, such a method includes:

combining together magnesium oxide (MgO), monopotassium phosphate ($KH_2PO_4$), stucco ($CaSO_4 \cdot \frac{1}{2} H_2O$), one or more silicate additives, and water with mixing (e.g., in a mixer reaction chamber) to form a reaction mixture; and allowing the reaction mixture to set to provide the building composition.

Such method may involve several sub reactions but, without intending to be bound by theory, the overall general mechanism is as follows:

$$3MgO+3KH_2PO_4+2CaSO_4 \cdot \tfrac{1}{2}H_2O+ \\ 3H_2O \rightarrow KMgPO_4 \cdot 6H_2O+K_2Ca(SO_4)_2 \cdot H_2O+ \\ Ca^{2+}+2Mg^{2+}+2(PO_4)^{3-}.$$

It should be noted that if MgO and/or stucco are provided in molar excess, or if the chemical reaction is not yet complete to achieve total reaction product mixture, MgO and/or stucco will remain in excess, and that the remaining ionic materials, i.e., ($Ca^{+2}$, $2 Mg^{2+}$ and $2(PO_4)^{3-}$ will either react with the remaining stucco or will form salt agglomerations upon drying. Without intending to be bound by theory, typically at least some of MgO and/or stucco remain unreacted, and these constituents structurally remain in an amorphous, randomly distributed matrix alongside the crystalline structures of Struvite-K and Syngenite. In various embodiments of the building composition as otherwise described herein, the combined content of amorphous matrix is present in the composition in an amount of about 1 wt % to about 40 wt %, or about 10 wt % to about 40 wt %, or about 20 wt % to about 40 wt %, or about 1 wt % to about 30 wt %, or about 10 wt % to about 30 wt %, or about 20 wt % to about 30 wt %, or about 25 wt % to about 35 wt %.

MgO, $KH_2PO_4$, stucco, and the one or more silicate additives may be provided in various amounts and ratios, depending on the desired properties for the building compositions of the disclosure. Although these starting materials and the resultant reaction products are shown as having specified ratios, it should be understood that varying the initial starting material ratios may change the reaction products and the amounts of reacted and unreacted starting materials. One skilled in the art would be able to determine required amounts of these starting materials and method parameters in order to provide the desired building compositions, particularly considering the disclosure of the chemical reactions and reaction parameters provided in U.S. Pat. No. 9,422,193, incorporated by reference herein. In certain embodiments as otherwise described herein, MgO is provided to the reaction mixture in amount of about 3.33 to about 70 weight % based on the total dry weight of the reaction mixture; $KH_2PO_4$ is present in amount of about 4.67 to about 70 weight based on the total dry weight of the reaction mixture; stucco is present in amount of about 10.5 to about 90 weight % based on the total combined dry weight of the reaction mixture. In certain embodiments as otherwise described herein, MgO is present in amount of about 10 to about 20 weight % based on the total dry weight of the reaction mixture; $KH_2PO_4$ is present in amount of about 25 to about 40 weight % based on the total dry weight of the reaction mixture; stucco is present in amount of about 40 to about 60 weight % based on the total dry weight of the reaction mixture.

In certain embodiments as otherwise described herein, MgO and $KH_2PO_4$ are provided to the reaction mixture in a weight ratio of about 1:1 to about 1:3, e.g., about 1:1.5 to about 1:3, or about 1:2 to about 1:3, or about 1:1 to about 1:2.5, or about 1:1.5 to about 1:2.5, or about 1:2 to about 1:2.5, or about 1:1 to about 1:2, or about 1:1.5 to about 1:2, or about 1:1.75 to about 1:2.25, or about 1:1.8 to about 1:2.2, or about 1:1.9 to about 1:2.1, or about 1:2.

In certain embodiments as otherwise described herein, MgO, $KH_2PO_4$, and stucco are provided to the reaction mixture in a weight ratio of about 1:2:1 to about 1:2:6, e.g., about 1:1.3:1 to about 1:1.3:6, or about 1:1.3:1.5 to about 1:1.3:2.5, or about 1:1.3:2 to about 1:2.5:3.5.

The one or more silicate additives can be provided to the reaction mixture in amounts sufficient to provide the desired amount of additive to the building composition. For example, in certain embodiments as otherwise described herein, the one or more silicate additives are provided to the reaction mixture in an amount of about 0.1% to about 15% by weight of the total dry weight of the reaction mixture. For example, in various embodiments as otherwise described herein, the one or more silicate additives are provided to the reaction mixture in an amount of about 0.1 wt % to about 10 wt %, or about 0.1 wt % to about 7 wt %, or about 0.1 wt % to about 5 wt %, or about 0.1 wt % to about 2 wt %, or about 0.1 wt % to about 1 wt %, or about 0.5 wt % to about 15 wt %, or about 0.5 wt % to about 10 wt %, or about 0.5 wt % to about 7 wt %, or about 0.5 wt % to about 5 wt %, or about 0.5 wt % to about 3 wt %, or about 0.5 wt % to about 1 wt %, or about 1 wt % to about 15 wt %, or about 1 wt % to about 10 wt %, or about 1 wt % to about 7 wt %, or about 1 wt % to about 5 wt %, or about 1 wt % to about 2 wt %, or about 2 wt % to about 15 wt %, or about 2 wt % to about 10 wt %, or about 2 wt % to about 7 wt %, or about 2 wt % to about 5 wt %, based on the total dry weight of the reaction mixture composition. In other embodiments as otherwise described herein, the one or more silicate additives are provided to the reaction mixture in an amount of about 4 wt % to about 15 wt %, or about 4 wt % to about 10 wt %, or about 4 wt % to about 7 wt %, based on the total dry weight of the reaction mixture.

To the mixture comprising MgO, $KH_2PO_4$, stucco, and one or more silicate, water is added to commence the reaction. In some embodiments, water (i.e., not counting water of hydration of the other components) is provided to the reaction mixture in amount of about 20 to about 50 weight %, e.g., about 25 wt % to about 50 wt %, or about 30 wt % to about 50 wt %, or about 35 wt % to about 50 wt %, or about 25 wt % to about 40 wt %, or about 30 wt % to about 40 wt %, or about 35 wt % to about 40 wt %, or about 20 wt % to about 35 wt %, or about 20 wt % to about 35 wt %, or about 30 wt % to about 35 wt %, or about 20 wt % to about 30 wt %, all based on the total weight of the reaction mixture.

The components of the reaction mixture can be combined in a variety of fashions. For example, in certain embodiments as otherwise described herein, dry materials are first combined, then water is added to commence the reaction. In certain embodiment, one or more silicate additives can be provided together with the water, e.g., in cases where they are water-soluble. But the person of ordinary skill in the art will appreciate that other combination processes can be used. The combination can be provided, for example, in a mixer reaction chamber.

A variety of other components can be present in the reaction mixture. For example, in certain embodiments as otherwise described herein, a buffer may be provided in the reaction mixture in order to delay reaction of the magnesium phosphate, which is exothermic and destabilizes the desired hydration reactions. One buffer suitable for use in the methods of the disclosure is a boric acid-based buffer. Another buffer suitable for use in the methods of the disclosure is a tartaric acid-based buffer. However, a buffer is not required to be used in the methods and compositions of the disclosure.

In certain embodiments as otherwise described herein, an accelerant may be provided to the reaction mixture. Such an accelerator can be used, for example, as a pretreatment the added water, and can further accelerate the Struvite-K reaction. One accelerator suitable for use in the methods of the disclosure is sulfuric acid ($H_2SO_4$). In certain embodiments as otherwise described herein, a dispersant may be used in the methods of the disclosure. One dispersant suitable for use in the methods of the disclosure is polynaphthalene sulfonate.

In certain embodiments as otherwise described herein, one or more silicone surfactants may be provided to the reaction mixture. Silicone surfactants can serve to stabilize reaction of the magnesium phosphate, and/or act as a defoamer (i.e., to break down any foam that may be generated in the process). Because the building compositions made by the methods of the disclosure are by their nature-resistant and do not breakdown in the presence of water, silicone surfactants may also impart additional and complete water impermeability to the resulting building composition. Silicone surfactants suitable for use in the methods and compositions of the disclosure include polydimethylsiloxane, polymethylhydrosiloxane, and silicone oils.

In one embodiment, the combined amount of one of more of buffers, accelerants, dispersants, silicone surfactants, or any combinations thereof that is provided to the reaction mixture is in the amount of less than 2 wt %, or less than 1.8 wt %, or less than 1.5 wt %, all based on the total dry weight of the reaction mixture.

One of skill in the art would recognize that certain method parameters, such as pH, water temperature, and timing of mixing and additions, may affect the final reaction products. For example, the method can be customized to produce the maximum amount of Struvite-K or to produce a maximum of the Syngenite, or a suitable desired combination of the two. As provided in U.S. Pat. No. 9,422,193, the degree and length of mixing plays a role in both how the reaction proceeds and the ultimate yield of Syngenite and Struvite-K. It was also determined that changing the timing of the reactions by, for example, increasing mix time from one stage to two stages ranging from 45 to 90 seconds yielded a stronger core material having required water resistance.

The amounts of the various components of the reaction mixture can be selected by the person of ordinary skill in the art to provide a building composition as otherwise described herein.

In certain embodiments as otherwise described herein, the methods of the disclosure may be carried out using a multi-stage mixing apparatus, such as a plug flow mixer, and/or scraper mixer. In some embodiments, the methods of the disclosure may be carried out using a mixer that allows for a long dwell time with starting material supply and feed-through/output controls equivalent to a manufacturing speed for a typical 4 foot wide and ¼ to 1" thick board, such as those ranging from approximately a minimum of 20 feet/min to a maximum of 750 feet/min.

As provided in U.S. Pat. No. 9,422,193, the temperature of water (i.e., the temperature of the water as it is added to the solid starting material) plays a role in both how the reaction proceeds and the ultimate yield of Syngenite and Struvite-K. For example, an increase in the temperature of the water decreases the mix reactivity rate, and simultaneously increases the time that must pass for the slurry to set. High temperatures, such as over 50° C., can impact the integrity of the resulting building composition and lead to cracking of the surface during the hardening process as the slurry sets. Therefore, in certain embodiments, the water temperature is about between 20° C. and 25° C.

In one non-limiting example, the methods of the disclosure may comprise the following starting materials:
  a. MgO, for example in an amount of about 14-18 wt % (based on the total combined weight of MgO, $KH_2PO_4$, and stucco). MgO may be lite dead burned, medium dead burned, hard dead burned, or a combination of any two or three alternatives;
  b. $KH_2PO_4$, for example in an amount of about 30-34 wt % (based on the total combined weight of MgO, $KH_2PO_4$, and stucco). $KH_2PO_4$ may be either of a food grade or agricultural grade;
  c. Stucco ($CaSO_4 \cdot \frac{1}{2}H_2O$), for example in an amount of about 48-52 wt % (based on the total combined weight of MgO, $KH_2PO_4$, and stucco). Stucco may be of a minimum purity ranging from approximately 65% to a maximum purity of 100%. The higher purity stucco improves the uptake of potassium as dihydrate is forming and thereby further slows the secondary Struvite-K reaction and elevates the Struvite-K yield in the final reaction;
  d. Water, for example in an amount of about 33-37 wt % (based on the total combined weight of MgO, $KH_2PO_4$, and stucco);
  e. silicate additive, for example in an amount of about 1-2 wt % (based on the total combined weight of MgO, $KH_2PO_4$, and stucco); and
  f. optionally additional additives, for example in a combined amount of less than about 1.5 wt % (based on the total combined weight of MgO, $KH_2PO_4$, and stucco). Additional additives may comprise $H_2SO_4$, $H_3BO_3$, polysiloxanes (such as polydimethylsiloxane), polynaphthalene sulfonate, or any combination thereof.

Once the components of the reaction mixture are combined, they can be allowed to set and dry to provide the building composition. The person of ordinary skill in the art will appreciate that the composition can be formed into a variety of shapes while wet, then allowed to set and dry in that shape. Conventional methods for making gypsum boards, e.g., including paper or plastic claddings, can be used. For example, in certain embodiments of the disclosure, the reaction mixture is disposed on a flat substrate (e.g. on paper or plastic), and formed into a sheet of the reaction mixture in the range of 0.5-2 inches thick, and allowed to set and dry. Before it is allowed to set and dry, a cover sheet (of paper or plastic) can be disposed on the sheet of material.

In certain embodiments, the building composition as otherwise described herein may have a set time of less than about 20 minutes, or less than about 15 minutes, or less than about 12 minutes, or in the range of about 5 minutes and 15 minutes, or in the range of about 5 minutes and 12 minutes, or in the range of about 5 minutes and 10 minutes.

Another aspect of the material provides a building composition made by a method as described herein.

Another aspect of the disclosure provides a building article comprising a building composition as otherwise described herein. The building article may also comprise a building substrate. In some embodiments of the building article, the building composition may be disposed adjacent at least one of the faces of the building substrate.

The building substrate can be formed from a variety of materials, as the person of ordinary skill in the art will appreciate. The building composition described herein can be formed on a variety of materials. In many desirable embodiments, the building substrate will be in sheet form (i.e., wherein the building substrate is a building substrate sheet). Advantageously, when a building substrate is in sheet form, as the person of ordinary skill in the art will appreciate, the building articles of the disclosure can find wide use in many construction applications.

Figure 1:
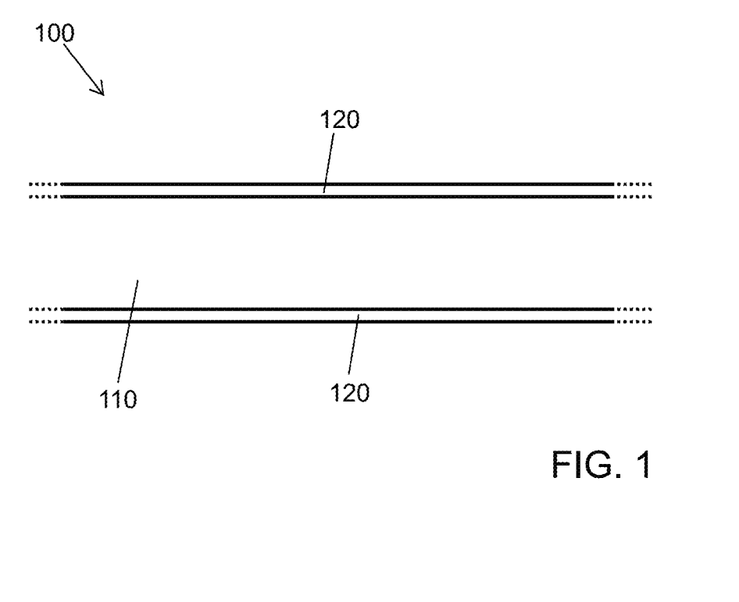
FIG. 1 is a schematic cross-sectional view of a wallboard according to one embodiment of the disclosure.

The building substrate can alternatively be any material used in the construction of exterior or interior wallboards, ceiling tiles, siding, fascias, soffits, etc. For example, in certain embodiments of the building article as otherwise described herein, the building substrate is wood paneling, wood planks, plywood, fiber board, fiberglass insulation, glass mesh, glass fibers, metal screen, or the like. In certain embodiments, the building composition layer may be coated directly on the building substrate (e.g., on a paper layer or a fiberglass layer). For example, one embodiment of the disclosure is a wallboard that includes the building composition of the disclosure, disposed between two liners. An example of such a wallboard is shown in cross-sectional view in FIG. 1. Wallboard 100 includes a building composition of the disclosure 110, disposed between two liners 120 (e.g., paper, fiberglass, or polymer).

The building substrate sheet can be porous or contain a pore structure, such that the building composition can be partially disposed within the pore structure of the substrate, as will be discussed in more detail below. For example, in certain embodiments of the building article as otherwise described herein, the building material substrate sheet is a sheet of fabric, i.e., having pores formed in the sheet. In certain such embodiments, the fabric is a woven fabric, for example, woven from thermoplastic fibers. In particular embodiments, the building substrate can include a non-woven material. Particular non-woven materials can include spun bond or point bond fabrics. For example, in certain embodiments of the vapor retarding articles as otherwise described herein, the building substrate is a non-woven polypropylene fabric, e.g., a point-bond polypropylene non-woven fabric. Other non-woven fabrics suitable for use in various embodiments of the building articles as otherwise described herein include nylon non-woven fabrics, poly (ethylene terephthalate) non-woven fabrics, other polyester non-woven fabrics, polystyrene non-woven fabrics, acrylonitrile/butadiene/styrene copolymer non-woven fabrics, and polyethylene non-woven fabrics. In other embodiments, a perforated thermoplastic film can be used as the building substrate sheet, e.g., a perforated polypropylene film, a perforated nylon film, a perforated PET film, a perforated polystyrene film, a perforated acrylonitrile/butadiene/styrene copolymer film, a perforated polyester film, or a perforated polyethylene film.

In certain embodiments of the building articles as otherwise described herein, the building substrate sheet is paper, such as kraft paper. The exact weight of the paper can vary, and illustrative weights include, but are not limited to, about 25 pounds to about 75 pounds per thousand square feet, for example about 39 pounds per thousand square feet. In other embodiments of the building articles as otherwise described herein, the building material substrate sheet is a scrim. The building substrate sheet may itself be made from multiple sublayers of material, as the person of ordinary skill in the art would appreciate.

In certain embodiments, however, the building composition may be applied on a building substrate sheet (e.g., fiberglass), which then can be applied to another substrate (e.g., by using an adhesive or other suitable attachment means).

The building article can have any desirable size for wallboard panels (interior or exterior), ceiling tiles, siding, fascias, soffits, etc. For example, the building article can have a length in the range of 4 to 20 feet (e.g., in the range of 8 to 12 feet, or in the range of 8 to 10 feet, or 8 feet, or 9 feet, or 10 feet) and/or a width in the range of 6 inches to 6 feet (e.g., in the range of 7 to 9 inches, or in the range of 2 to 6 feet, or in the range of 3 to 5 feet, or about 4 feet). In certain embodiments, the building article can have a thickness in the range of 0.3 mm to 35 mm, e.g., 0.5 mm to 25 mm, or 0.5 mm to 15 mm, or 0.5 mm to 10 mm, or 0.5 mm to 5 mm, or 1 mm to 35 mm, or 1 mm to 25 mm, or 1 mm to 15 mm, or 1 mm to 10 mm, or 1 mm to 5 mm, or 5 mm to 35 mm, or 5 mm to 25 mm, or 5 mm to 15 mm, or 5 mm to 10 mm, or 5 mm to 7 mm, or 10 mm to 35 mm, or 20 mm to 35 mm, or 10 mm to 25 mm, or 20 mm to 25 mm.

The building article can have any desired construction type for a building construction article (such as wallboard panels (interior or exterior), ceiling tiles, siding, fascias, soffits, etc.). For example, the article can be a rectangular sheet having square edges or a rectangular sheet having taper edges.

Certain aspects of the disclosure are now explained further via the following non-limiting examples.

EXAMPLES

Example 1

The building compositions of the disclosure were prepared as described in U.S. Pat. No. 9,422,193, incorporated by reference herein. Specifically, MgO: $KH_2PO_4$ ("MKP"): stucco were mixed in 1:2:3 weight ratio, with the MgO, MKP, and stucco being added in doses of 15 g each as dry powder to the mixer. This dry mixture is noted in Table 1 as "L123". The suitable silicate additive is then added, and the materials are mixed using a flat spatula for about 30-60 seconds. To this dry mixture, water having a temperature between about 20 and about 21° C. (e.g., 20.4° C.) was added. The wet mixture (i.e., the reaction mixture including the water), was mixed in a mixer (at 1000 RPM) for a period of about 120 seconds, and the mixture was then allowed to set. Several examples are disclosed in Table 1.

TABLE 1

| Composition | Process water temp. (° C.) | Max temp. (° C.) | Set time (min) | Avg. bulk density (gm/cc) | Comp. strength (psi) |
|---|---|---|---|---|---|
| L123 + 35 wt % water | 20.4 | 49.4 | 8 | 1.35 | 640 ± 71 |
| L123 + 35 wt % water + 1 wt % fly ash (type C)[1] | 20.4 | 48.8 | 11.5 | 1.35 | 697 ± 162 |
| L123 + 35 wt % water + 5 wt % fly ash (type C)[1] | 20.4 | 47.1 | 8 | 1.33 | 559 ± 56 |
| MgO:MKP:fly ash (type C)[1] (1:2:3 by wt) + 35 wt % water | 20.3 | 46.9 | 22 | 1.38 | 311 ± 20 |
| L123 + 35 wt % water + 1 wt % diatomaceous earth[2] | 20.4 | 48.2 | 5 | 1.33 | 607 ± 108 |
| L123 + 35 wt % water + 5 wt % diatomaceous earth[2] | 20 | 47.5 | 5 | 1.3 | 683 ± 104 |
| L123 + 35 wt % water + 1 wt % fly ash (type F)[3] | 20.5 | 49.2 | 13 | 1.35 | 764 ± 104 |
| L123 + 35 wt % water + 5 wt % fly ash (type F)[3] | 20.2 | 48.3 | 5.5 | 1.32 | 656 ± 86 |
| MgO:MKP:fly ash (type F)[3] (1:2:3 by wt) + 35 wt % water | 20.4 | 48.8 | 6 | 1.31 | 486 ± 107 |
| L123 + 35 wt % water + 1 wt % micro silica[4] | 20.4 | 49 | 9.5 | 1.34 | 676 ± 98 |
| L123 + 35 wt % water + 1 wt % micro silica[4] | 20.4 | 48 | 9.5 | 1.3 | 706 ± 161 |
| L123 + 35 wt % water + 2 wt % fumed silica[4] | 20.6 | 48.8 | 5.5 | 1.35 | 686 ± 207 |
| L123 + 35 wt % water + 1 wt % slag cement | 20.4 | 43 | 18 | 1.38 | 596 ± 53 |
| L123 + 35 wt % water + 1 wt % glass fibers (½") | 20.4 | 48.6 | 7.5 | — | 827 ± 95 |
| L123 + 35 wt % water + 2 wt % glass fibers (½") | 20.4 | 48.7 | 7 | 1.31 | 980 ± 116 |
| L123 + 35 wt % water + 1 wt % glass fibers (¼") | 20.4 | 48.8 | 5 | 1.32 | 749 ± 51 |
| L123 + 35 wt % water + 2 wt % glass fibers (¼") | 20.3 | 49.2 | 4.25 | 1.31 | 980 ± 149 |

[1] fly ash (type C) obtained from Laramie WV Power Plant;
[2] diatomaceous earth obtained from Food Grade;
[3] Fly ash (type F) obtained from Sammis Station-First Energy Plant Pittsburgh;
[4] Micro silica obtained from Norchem Surprisingly, the building compositions comprising diatomaceous earth, fly ash Type F, or glass fibers reduced set time by over 30% as compared to the composition with no silicate additive. In addition, these compositions significantly improved or maintained compression strength as compared to the composition with no silicate additive.

Example 2

In another set of examples, non-sintering inclusions are introduced as constraints on stucco sintering. Here, two varieties (grades) of wollastonite (a calcium silicate mineral) with different aspect ratios were investigated. The role of aspect ratio was a significant finding in reducing shrinkage while not compromising compressive strength on similarly fabricated samples. Table 2 shows the initial data obtained with Wollastonite Grade MD 200 with aspect ratio of 5:1 and Wollastonite NYAD G that had an aspect ratio of 15:1. Tables 3 and 4 shows shrinkage and compressive strength data for a variety of formulations.

TABLE 2

Shrinkage and Compressive Data with Two Wollastonite Grades Used in L123 Board Sample Formulation

| Formulation | % Shrinkage | Compressive Strength (psi) |
|---|---|---|
| L123-10% Wollastonite (MD 200)-27% Water | 16.03 +− 1.00 | 1826 +− 105 |
| L123-10% Wollastonite (NYAD G)-27% Water | 8.77 +− 2.00 | 2800 +− 599 |

TABLE 3

Thermal Shrinkage versus Wollastonite (NYAD G) content in L123 Formulation

| % by weight Wollastonite | % Shrinkage | Std. Dev. |
|---|---|---|
| 0 | 16.72 | 0.49 |
| 1 | 18.18 | 0.56 |
| 2 | 19.38 | 1.01 |
| 3 | 17.04 | 0.73 |
| 4 | 17.32 | 0.34 |
| 4 | 13.21 | 0.68 |
| 10 | 8.77 | 2 |

TABLE 4

Compressive Strength versus Wollastonite (NYAD G) content in L123 Formulation

| % by weight Wollastonite | Compressive Stg (psi) | Std Dev |
|---|---|---|
| 0 | 2422 | 549 |
| 1 | 2158 | 237 |
| 2 | 2146 | 141 |
| 3 | 2294 | 61 |
| 4 | 2065 | 249 |
| 10 | 2800 | 599 |

Figure 2:
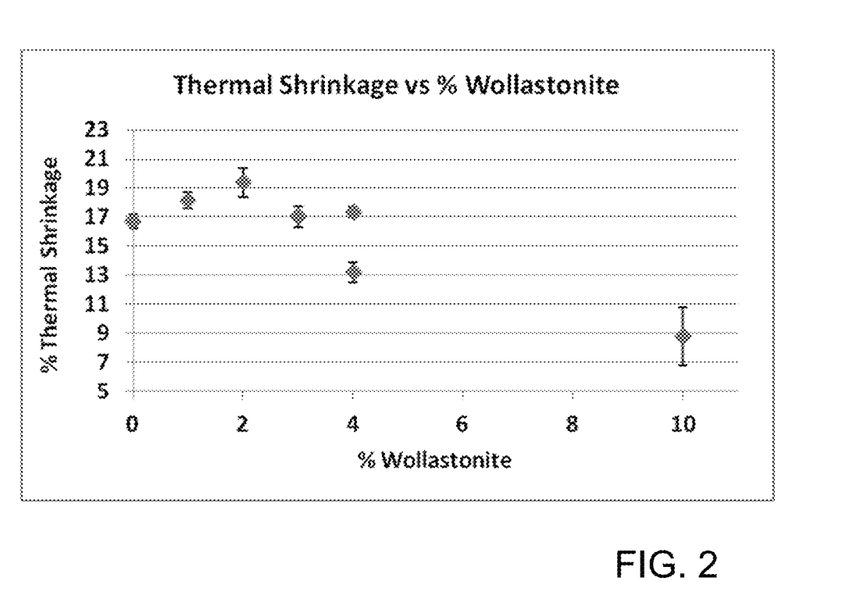
FIG. 2 is a graph of thermal shrinkage as a function of Wollastonite (NYAD G) content in an example L123 formulation.

FIG. 2 and Table 3 outline the additional thermal shrinkage data obtained with NYAD G Wollastonite at lower concentrations in L123 (1 part MgO, 2 part $KH_2PO_4$ (MKP), 3 part Stucco—All by Weight) formulation showing the onset in reduction of shrinkage from about 3% to reach plateau values at 10% concentration of Wollastonite NYAD G, which is a significant reduction of shrinkage in the L123 Mag Phosphate formulation.

Figure 3:
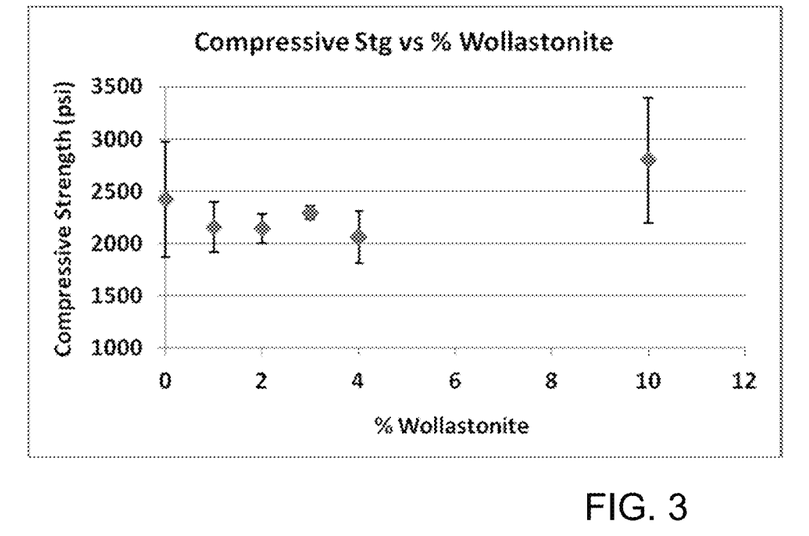
FIG. 3 is a graph of compressive strength as a function of Wollastonite (NYAD G) content in an example L123 formulation.

FIG. 3 and Table 4 together show the plot and data for the compressive strengths with NYAD G Wollastonite showing no degradation to compressive strength with increased loading to 10 wt %.

Thus, NYAD G exhibited a significant reduction in thermal shrinkage in the materials of the present disclosure. Without intending to be bound by theory, it is believed that the high aspect ratio of the additive allows the formation of a network of touching inclusions that form a rigid backbone in the matrix that negates sintering and shrinkage. Similar results were observed with E-glass. In addition, similar results are expected with any non-sintering ceramic material that does not soften or melt between 100° C. and 1500° C.

Example 3

In this Example, instead of Wollastonite, glass or ceramic bubbles are used as the silicate additive. Two different materials were added to in amounts of 15% by weight. These bubbles were mixed in dry form with a "J121" formulation of the board (1 part MgO, 2 parts MKP, and 1 part stucco by weight). The mixture was sheared for 4 minutes with 31% water and poured in the mold (1" cube) and dried in the oven at 40° C., overnight. The resulting cube samples were tested for fire shrinkage. The samples were heated at 983° C. for 10 minutes and measured for height changes after the exposure. Two ceramic bubbles were chosen for this experiment 1) Mullite bubbles with true density of 0.77 g/mL, and bubble size ranging from 250-350 μm. 2) Glass bubbles 18 μm in diameter with a true density 0.6 g/mL.

Figure 4:
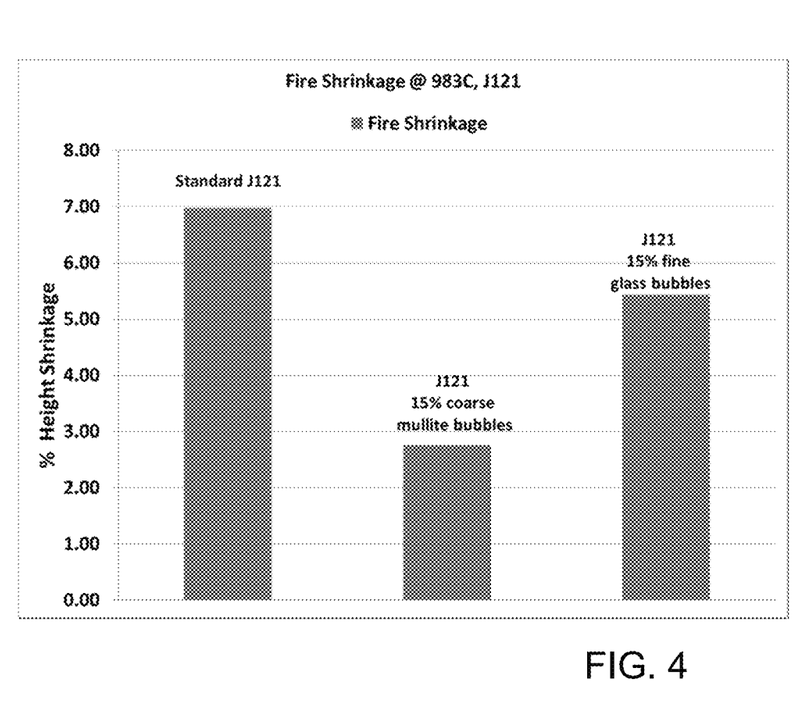
FIG. 4 is a bar graph of shrinkage data for two different silicate bubbles in an example J121 formulation.

FIG. 4 depicts the percentage shrinkage in height dimension of the samples with Mullite bubbles, glass bubbles and base line standard "J121" material. It can be seen from the figure that the % shrinkage dropped from 7% to around 2.8% for Mullite bubbles and 5.3% for glass bubbles. From the data, Mullite bubbles showed significantly improved performance due to coarser particle size. As the J121 matrix starts shrinking at higher temperature, its shrinkage was constrained by the coarser spheres interlocking with each other. This technique can be used in current materials but can also be adopted for any building material panels for addressing shrinkage issues. That is, while the exemplary embodiments that were tested all were in the context of MgO-MKP boards, other types of board or building materials, e.g., separation panels, ceiling tiles, doors, etc. may also utilize the teaching of this invention irrespective of the materials used together with the inventive additives disclosed herein.

The compositions, articles and methods of the disclosure are further described by the following non-limiting enumerated embodiments, which can be combined in any logically and technically consistent manner:

Embodiment 1

A building composition, comprising
Struvite-K ($KMgPO_4 \cdot 6H_2O$);
Syngenite ($K_2Ca(SO_4)_2 \cdot H_2O$); and
one or more silicate additives.

Embodiment 2

The building composition of embodiment 1, wherein Struvite-K is present in an amount of about 0.1 wt % to about 67 wt %, for example, about 0.1 wt % to about 50 wt %, or about 0.1 wt % to about 40 wt %, or about 0.1 wt % to about 30 wt %, or about 0.1 wt % to about 20 wt %, or about 1 wt % to about 67 wt %, or about 1 wt % to about 50 wt %, or about 1 wt % to about 40 wt %, or about 1 wt % to about 30 wt %, or about 1 wt % to about 20 wt %, or about 10 wt % to about 67 wt %, or about 10 wt % to about 50 wt %, or about 10 wt % to about 40 wt %, or about 10 wt % to about 30 wt %, or about 10 wt % to about 20 wt %, or about 20 wt % to about 67 wt %, or about 20 wt % to about 50 wt %, or about 20 wt % to about 45 wt %, or about 20 wt % to about 40 wt %, or about 20 wt % to about 30 wt %, or about 25 wt % to about 50 wt %, or about 25 wt % to about 45 wt %, or about 30 wt % to about 45 wt %, or about 25 wt % to about 35 wt %, based on the total dry weight of the building composition.

Embodiment 3

The building composition of embodiment 1, wherein Struvite-K is present in an amount of about 10 wt % to about 50 wt %.

Embodiment 4

The building composition of embodiment 1, wherein Struvite-K is present in an amount of about 20 wt % to about 67 wt %.

Embodiment 5

The building composition of any of embodiments 1-4, wherein Syngenite is present in an amount of about 1 wt % to about 80 wt %, for example, about 1 wt % to about 70 wt %, or about 1 wt % to about 60 wt %, or about 1 wt % to about 50 wt %, or about 5 wt % to about 80 wt %, or about 5 wt % to about 70 wt %, or about 5 wt % to about 60 wt %, or about 5 wt % to about 50 wt %, or about 5 wt % to about 40 wt %, or about 5 wt % to about 30 wt %, or about 5 wt % to about 20 wt %, or about 5 wt % to about 15 wt %, or about 5 wt % to about 10 wt %, or about 10 wt % to about 80 wt %, or about 10 wt % to about 70 wt %, or about 10 wt % to about 60 wt %, or about 10 wt % to about 50 wt %, or about 30 wt % to about 80 wt %, or about 30 wt % to about 70 wt %, or about 30 wt % to about 60 wt %, or about 30 wt % to about 50 wt %, or about 40 wt % to about 60 wt %, or about 7 wt % to about 15 wt %, or about 7 wt % to about 12 wt %, or about 8 wt % to about 11 wt %, all based on the total dry weight of the building composition.

Embodiment 6

The building composition of any of embodiments 1-4, wherein Syngenite is present in an amount in the range of about 10 wt % to about 50 wt %.

Embodiment 7

The building composition of any of embodiments 1-4, wherein Syngenite is present in an amount in the range of about 30 wt % to about 70 wt %.

Embodiment 8

The building composition of any of embodiments 1-7, further comprising a calcium sulfate material.

Embodiment 9

The building composition of embodiment 8, wherein the calcium sulfate material is present in an amount in the range of about 0.1 wt % to about 67 wt %, for example, about 0.1 wt % to about 50 wt %, or about 0.1 wt % to about 40 wt %, or about 0.1 wt % to about 30 wt %, or about 0.1 wt % to about 20 wt %, or about 1 wt % to about 67 wt %, or about 1 wt % to about 50 wt %, or about 1 wt % to about 40 wt %, or about 1 wt % to about 30 wt %, or about 1 wt % to about 20 wt %, or about 10 wt % to about 67 wt %, or about 10 wt % to about 50 wt %, or about 10 wt % to about 40 wt %, or about 10 wt % to about 30 wt %, or about 10 wt % to about 20 wt %, or about 18 wt % to about 32 wt %, or about 25 wt % to about 35 wt %, or about 20 wt % to about 30 wt %, or about 27 wt % to about 32 wt %, or about 27 wt % to about 30 wt %.

Embodiment 10

The building composition of embodiment 8, wherein the calcium sulfate material is present in an amount in the range of about 0.1 wt % to about 30 wt %

Embodiment 11

The building composition of embodiment 8, wherein the calcium sulfate material is present in an amount in the range of about 0.1 wt % to about 10 wt %.

Embodiment 12

The building composition of any of embodiments 1-11, wherein anhydrite ($CaSO_4$), stucco ($CaSO_4 \cdot \frac{1}{2} H_2O$), gypsum ($CaSO_4 \cdot 2H_2O$), or a combination of two or more thereof is present in the building composition.

Embodiment 13

The building composition of embodiment 12, wherein the total amount of anhydrite, stucco and gypsum in the building composition is in the range of about 0.1 wt % to about 67 wt %, for example, about 0.1 wt % to about 50 wt %, or about 0.1 wt % to about 40 wt %, or about 0.1 wt % to about 30 wt %, or about 0.1 wt % to about 20 wt %, or about 1 wt % to about 67 wt %, or about 1 wt % to about 50 wt %, or about 1 wt % to about 40 wt %, or about 1 wt % to about 30 wt %, or about 1 wt % to about 20 wt %, or about 10 wt % to about 67 wt %, or about 10 wt % to about 50 wt %, or about 10 wt % to about 40 wt %, or about 10 wt % to about 30 wt %, or about 10 wt % to about 20 wt %.

Embodiment 14

The building composition of embodiment 13, wherein the total amount of anhydrite, stucco and gypsum in the building composition is in the range of about 0.1 wt % to about 30 wt %.

Embodiment 15

The building composition of embodiment 13, wherein the total amount of anhydrite, stucco and gypsum in the building composition is in the range of about 0.1 wt % to about 10 wt %.

Embodiment 16

The building composition of any of embodiments 1-15, wherein bassanite is present in the calcium sulfate material of the building composition.

Embodiment 17

The building composition of embodiment 16, wherein bassanite is present in an amount up to 10 wt %.

Embodiment 18

The building composition of embodiment 16, wherein bassanite is present in an amount up to 5 wt %.

Embodiment 19

The building composition of any of embodiments 1-18, wherein the building composition is substantially free of gypsum (e.g., less than 1 wt %) of gypsum.

Embodiment 20

The building composition of embodiment 19, wherein the calcium sulfate material is stucco.

Embodiment 21

The building composition of any of embodiments 1-20, further comprising magnesium oxide (MgO).

Embodiment 22

The building composition of embodiment 21, wherein MgO is present in an amount of about 0.1 wt % to about 20 wt %, or about 0.1 wt % to about 15 wt %, or about 0.1 wt % to about 10 wt %, or about 0.1 wt % to about 5 wt %, or about 1 wt % to about 20 wt %, or about 1 wt % to about 15 wt %, or about 1 wt % to about 10 wt %, or about 1 wt % to about 5 wt %, or about 5 wt % to about 20 wt %, or about 5 wt % to about 15 wt %, or about 5 wt % to about 10 wt %, or about 2 wt % to about 10 wt %, or about 2 wt % to about 8 wt %, or about 3 wt % to about 6 wt %, or about 4 wt % to about 5 wt %, all based on the total dry weight of the building composition.

Embodiment 23

The building composition of embodiment 21, wherein MgO is present in an amount in the range of about 2 wt % to about 10 wt %.

Embodiment 24

The building composition of any of embodiments 1-23, wherein Struvite-K is present in the composition in an amount of about 25 wt % to about 33 wt %, Syngenite is present in the composition in an amount of about 7 wt % to about 12 wt %, MgO is present in the composition in an amount of about 3 wt % to about 6 wt %, and stucco is present in the composition in an amount of about 26 wt % to about 31 wt %.

Embodiment 25

The building composition of any of embodiments 1-23, wherein Struvite-K is present in the composition in an amount of about 10 wt % to about 50 wt %, Syngenite is present in the composition in an amount of about 5 wt % to about 30 wt %, MgO is present in the composition in an amount of about 2 wt % to about 10 wt %, and stucco is present in the composition in an amount of about 1 wt % to about 35 wt %.

Embodiment 26

The building composition of embodiment 1, including the silicate additive but otherwise as described in U.S. Pat. No. 9,422,193.

Embodiment 27

The building composition of any of embodiments 1-26, wherein the silicate additive has at least 75 mol % oxide of silicon on a semimetal/metal atomic basis.

Embodiment 28

The building composition of any of embodiments 1-27, wherein the one or more silicate additives comprises (or is) a silica material.

Embodiment 29

The building composition of any of embodiments 1-28, wherein the one or more silicate additives comprises (or is) diatomaceous earth.

Embodiment 30

The building composition of any of embodiments 1-29, wherein the one or more silicate additives comprises (or is) wollastonite.

Embodiment 31

The building composition of any of embodiments 1-30, wherein the one or more silicate additives comprises (or is) fly ash.

Embodiment 32

The building composition of any of embodiments 1-31, wherein the one or more silicate additives comprises (or is) an alkali silicate, such as a sodium silicate or a potassium silicate.

Embodiment 33

The building composition of any of embodiments 1-32, wherein the one or more silicate additives comprises (or is) an alkaline earth silicate.

Embodiment 34

The building composition of any of embodiments 1-33, wherein the one or more silicate additives comprises (or is) silicic acid.

Embodiment 35

The building composition of any of embodiments 1-34, wherein the one or more silicate additives comprises (or is) glass or ceramic in the form of fibers or platelets.

Embodiment 36

The building composition of embodiment 35, wherein the glass or ceramic fibers or platelets are silane-treated.

Embodiment 37

The building composition of embodiment 35 or embodiment 36, wherein the glass or ceramic fibers or platelets have an average length of less than 15 mm, e.g., less than 10 mm, or less than 8 mm.

Embodiment 38

The building composition of any of embodiments 1-37, wherein the one or more silicate additives comprises (or is) glass or ceramic bubbles.

Embodiment 39

The building composition of any of embodiments 1-38, wherein the one or more silicate additives are present in an amount of about 0.1% to about 10% by weight of the total dry weight of the building composition.

Embodiment 40

The building composition of any of embodiments 1-38, wherein the one or more silicate additives are present in an amount of about 0.1 wt % to about 7 wt %, or about 0.1 wt % to about 5 wt %, or about 0.1 wt % to about 3 wt %, or about 0.1 wt % to about 2 wt %, or about 0.1 wt % to about 1 wt %, or about 0.5 wt % to about 10 wt %, or about 0.5 wt % to about 5 wt %, or about 0.5 wt % to about 7 wt %, or about 0.5 wt % to about 3 wt %, or about 0.5 wt % to about 2 wt %, or about 0.5 wt % to about 1 wt %, or about 1 wt % to about 10 wt %, or about 1 wt % to about 7 wt %, or about 1 wt % to about 5 wt %, or about 1 wt % to about 3 wt %, or about 1 wt % to about 2 wt %, or about 2 wt % to about 10 wt %, or about 2 wt % to about 7 wt %, or about 2 wt % to about 5 wt %, or about 4 wt % to about 10 wt %, or about 4 wt % to about 7 wt % by weight of the total dry weight of the building composition.

Embodiment 41

The building composition of any of embodiments 1-38, wherein the one or more silicate additives are present in an amount of about 4 wt % to about 15 wt % of the total dry weight of the building composition.

Embodiment 42

The building composition of any of embodiments 1-38, wherein the one or more silicate additives are present in an amount of about 4 wt % to about 10 wt % of the total dry weight of the building composition.

Embodiment 43

The building composition of any of embodiments 1-38, wherein the one or more silicate additives are present in an amount of about 4 wt % to about 7 wt % of the total dry weight of the building composition.

Embodiment 44

The building composition of any of embodiments 1-38, wherein the one or more silicate additives are present in an amount of about 1 wt % to about 7 wt % of the total dry weight of the building composition.

Embodiment 45

The building composition of any of embodiments 1-44, wherein the combined content of Struvite-K, Syngenite, the one or more silicate additives (including any reaction products thereof), magnesium (i.e., in a form other than Struvite-K, and magnesium oxide), calcium (i.e., in a form other than Syngenite and calcium sulfate), phosphate (i.e., in a form other than Struvite-K), and optionally magnesium oxide and/or calcium sulfate material is at least about 80 wt %, for example, at least about 85 wt %, or at least about 90 wt % of the building composition.

Embodiment 45

The building composition of any of embodiments 1-44, wherein the combined content of Struvite-K, Syngenite, the one or more silicate additives (including any reaction products thereof), magnesium (i.e., in a form other than Struvite-K, and magnesium oxide), calcium (i.e., in a form other than Syngenite and calcium sulfate), phosphate (i.e., in a form other than Struvite-K), and optionally magnesium oxide and/or calcium sulfate material is at least about 95 wt %, for example, at least about 97 wt %, or at least about 98 wt %, or at least about 99 wt %, or about 100 wt % of the building composition.

Embodiment 46

A method of preparing the building composition of any of embodiments 1-45, the method comprising:
 combining together magnesium oxide (MgO), monopotassium phosphate ($KH_2PO_4$), stucco ($CaSO_4 \cdot \frac{1}{2} H_2O$), one or more silicate additives, and water with mixing (e.g., in a mixer reaction chamber) to form a reaction mixture; and
 allowing the reaction mixture to set to provide the building composition.

Embodiment 47

The method of embodiment 47, wherein MgO is provided in amount of about 3.33 to about 70 weight % based on the total dry weight of the reaction mixture; $KH_2PO_4$ is provided in amount of about 4.67 to about 70 weight % based on the total dry weight of the reaction mixture; stucco is provided in amount of about 10.5 to about 90 weight based on the total dry weight of the reaction mixture.

Embodiment 48

The method of embodiment 47, wherein MgO is provided in amount of about 10 to about 20 weight % based on the total dry weight of the reaction mixture; $KH_2PO_4$ is provided in amount of about 25 to about 40 weight % based on the total dry weight of the reaction mixture; stucco is present in amount of 40 to about 60 weight % based on the total dry weight of the reaction mixture.

Embodiment 49

The method of embodiment 47 or embodiment 48, wherein MgO and $KH_2PO_4$ are provided in a weight ratio of about 1:1 to about 1:3, e.g., about 1:1.5 to about 1:3, or about 1:2 to about 1:3, or about 1:1 to about 1:2.5, or about 1:1.5 to about 1:2.5, or about 1:2 to about 1:2.5, or about 1:1 to about 1:2, or about 1:1.5 to about 1:2, or about 1:1.75 to about 1:2.25, or about 1:1.8 to about 1:2.2, or about 1:1.9 to about 1:2.1, or about 1:2.

Embodiment 50

The method of any of embodiments 47-49, wherein MgO, $KH_2PO_4$, and stucco are provided in the weight ratio of about 1:2:1 to about 1:2:6, e.g. about 1:1.3:1 to about 1:1.3:6, or about 1:1.3:1.5 to about 1:1.3:2.5, or about 1:1.3:2 to about 1:2.5:3.5.

Embodiment 51

The method of any of embodiments 47-50, wherein the one or more silicate additives is present in the reaction mixture in an amount of 0.1% to about 15% by weight of the total dry weight of the reaction mixture.

Embodiment 52

The method of any of embodiments 47-50, wherein the one or more silicate additives is present in the reaction mixture in an amount of 0.1% to about 10% by weight of the total dry weight of the reaction mixture.

Embodiment 53

The method of any of embodiments 47-52, wherein water is provided in amount of about 20 to about 40 weight % e.g., about 25 wt % to about 40 wt %, or about 30 wt % to about 40 wt %, or about 35 wt % to about 40 wt %, or about 20 wt % to about 35 wt %, or about 20 wt % to about 35 wt %, or about 30 wt % to about 35 wt %, or about 20 wt % to about 30 wt %, all based on the total weight of the reaction mixture.

Embodiment 54

The method of any of embodiments 47-53, further comprising providing to the reaction mixture one or more of buffers, accelerants, dispersants, silicones, or any combinations thereof.

Embodiment 55

The method of embodiment 54, wherein the combined amount of one of more of buffers, accelerants, dispersants, silicones, or any combinations thereof is in the amount of less than 2 wt %, or less than 1.8 wt %, or less than 1.5 wt %, all based on the total dry weight of the reaction mixture.

Embodiment 56

A building composition made by the method of any of embodiments 47-55.

Embodiment 57

A building article comprising the building composition of any of embodiments 1-46 and embodiment 56.

Embodiment 58

The building article of embodiment 57, further comprising a building substrate (such as fiberglass, paper, plastic, glass mesh, glass fibers, or metal screen).

Embodiment 59

The building article of embodiment 58, wherein the building composition is disposed adjacent at least one of the faces of the building substrate.

Embodiment 60

A building article of embodiment 59, comprising a sheet of the building composition, clad on at least one sides by a sheet of paper, plastic, scrim, or fabric.

Embodiment 61

A building article in the form of any of embodiments 57-60, in the form of a wallboard.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A building composition, comprising
Struvite-K ($KMgPO_4 \cdot 6H_2O$);
Syngenite ($K_2Ca(SO_4)_2 \cdot H_2O$); and
one or more silicate additives each selected from diatomaceous earth, wollastonite, fly ash, alkali silicate, alkaline earth silicate, silicic acid, and glass or ceramic bubbles.

2. The building composition of claim 1, wherein Struvite-K is present in an amount of about 10 wt % to about 50 wt %, and Syngenite is present in an amount in the range of about 10 wt % to about 50 wt %.

3. The building composition of claim 2, wherein a calcium sulfate material is present in the building composition in an amount in the range of about 0.1 wt % to about 30 wt %.

4. The building composition of claim 1, wherein the silicate additive has at least 75 mol % oxide of silicon on a semimetal/metal atomic basis.

5. The building composition of claim 1, wherein the one or more silicate additives comprises diatomaceous earth.

6. The building composition of claim 1, wherein the one or more silicate additives comprises wollastonite.

7. The building composition of claim 1, wherein the one or more silicate additives comprises fly ash.

8. The building composition of claim 1, wherein the one or more silicate additives comprises an alkali silicate and/or an alkaline earth silicate.

9. The building composition of claim 1, wherein the one or more silicate additives comprises silicic acid.

10. The building composition of claim 1, wherein the one or more silicate additives comprises glass or ceramic bubbles.

11. The building composition of claim 1 wherein the one or more silicate additives are present in an amount of about 0.1% to about 10% by weight of the total dry weight of the building composition.

12. The building composition of claim 1 wherein the one or more silicate additives are present in an amount of about 4 wt % to about 15 wt % of the total dry weight of the building composition.

13. The building composition of claim 1 wherein the combined content of Struvite-K, Syngenite, the one or more silicate additives, any reaction products of the one or more silicate additives that are present, magnesium in a form other than Struvite-K and magnesium oxide, calcium in a form other than Syngenite and calcium sulfate, phosphate in a form other than Struvite-K, and if present, magnesium oxide and/or calcium sulfate material is at least about 95 wt % of the building composition.

14. The building composition of claim 1, wherein Struvite-K is present in the composition in an amount of about 25 wt % to about 33 wt %, Syngenite is present in the composition in an amount of about 7 wt % to about 12 wt %, MgO is present in the composition in an amount of about 3 wt % to about 6 wt %, and stucco is present in the composition in an amount of about 26 wt % to about 31 wt %.

15. The building composition of claim 1, wherein Struvite-K is present in the composition in an amount of about 10 wt % to about 50 wt %, Syngenite is present in the composition in an amount of about 5 wt % to about 30 wt %, MgO is present in the composition in an amount of about 2 wt % to about 10 wt %, and stucco is present in the composition in an amount of about 1 wt % to about 35 wt %.

16. A method of preparing the building composition of claim 1 the method comprising:
combining together magnesium oxide (MgO), monopotassium phosphate ($KH_2PO_4$), stucco ($CaSO_4 \cdot \frac{1}{2}H_2O$), one or more silicate additives, and water with mixing to form a reaction mixture; and
allowing the reaction mixture to set to provide the building composition.

17. The method of claim 16, wherein MgO and $KH_2PO_4$ are provided in the weight ratio of about 1:1 to about 1:3, and wherein MgO, $KH_2PO_4$, and stucco are provided in the weight ratio of about 1:2:1 to about 1:2:6.

18. The method of claim 16, wherein the one or more silicate additives is present in the reaction mixture in an amount of 0.1% to about 15% by weight of the total dry weight of the reaction mixture.

19. A building article comprising the building composition of claim 1.

* * * * *